May 11, 1965

W. R. MILLER 3,183,386

MULTIPLE OUTPUT GENERATOR

Filed May 17, 1962

INVENTOR.
WILLIAM R. MILLER

BY *Robert H. Montgomery*
HIS ATTORNEY

May 11, 1965

W. R. MILLER 3,183,386

MULTIPLE OUTPUT GENERATOR

Filed May 17, 1962

INVENTOR.
WILLIAM R. MILLER
BY *Robert H Montgomery*
HIS ATTORNEY

INVENTOR.
WILLIAM R. MILLER
BY Robert H Montgomery
HIS ATTORNEY

*INVENTOR.*
WILLIAM R. MILLER
BY *Robert H Montgomery*
HIS ATTORNEY

United States Patent Office 3,183,386
Patented May 11, 1965

3,183,386
MULTIPLE OUTPUT GENERATOR
William R. Miller, Erie, Pa., assignor to General Electric Company, a corporation of New York
Filed May 17, 1962, Ser. No. 195,484
5 Claims. (Cl. 310—149)

This invention relates to dynamoelectric machines, and more particularly to multiple output generators.

Multiple output generators may be used to supply electrical energy to a multiplicity of motors designed to control different degrees of motion of a mechanism or device. This invention provides a new and improved multiple output generator for such service, which, for purposes of illustration, will be described as applied to a power shovel or crane which has three degrees of motion, each controlled by a separate motor which is supplied electrical energy from a separate output circuit of a triple output generator. In a power shovel the three motions are termed hoist, crowd and swing. "Hoist" refers to lifting of the bucket, "crowd" refers to moving the bucket into a mass, such as a bank, to fill the bucket, and "swing" refers to swinging the boom carrying the bucket from one point to another. These terms are used hereinafter for clarity of reference only in referring to different circuits of a multiple output generator. The equivalent motions of a crane are referred to as hoist, luff and slew.

In either of these applications it is the hoist motor that demands the largest load from the generator, and it is quite common that hoist loading of the generator will be twice the swing or crowd loads. Generators used in this type of service supply a separate load circuit from each pair of brush terminals and have separate field control for each output circuit so that the direction and magnitude of each output circuit voltage, and therefore the load thereon may be independently controlled.

To exemplify a typical loading of a triple output generator in excavation or earth-moving service, assume that a power shovel is digging into a bank of earth to fill a bucket, lifting the bucket, and swinging it to a second location. As the bucket is "crowded" into the bank, one crowd circuit of the generator is loaded, and also the hoist circuit, as the bucket is simultaneously crowded into and lifted upwardly through the bank. When the bucket is filled, it may then be further hoisted and swung to a second position for unloading, which causes loading of the hoist circuit as the bucket is lifted, and then simultaneous loading of the hoist and swing circuits as the boom with raised bucket thereon is swung to a position for preloading. During this latter motion, the motor controlling the hoist motion is exerting a holding torque on the raised and loaded bucket, and is therefore demanding a very large load current from the generator.

For maximum efficiency, multiple output generators should be so arranged that each output circuit is electrically and magnetically independent of the others and is not affected by loading of another output circuit, even though all circuits share a portion of the magnetic circuit and armature windings.

The primary limitation on ratings of multiple output generators in the service described is not due to heating, as with more conventional generators inasmuch as all circuits are not leaded simultaneously and continuously, but to the commutating ability of the generator. The size of the generator is determined by the current it must commutate, and hence the magnitude of the armature reaction. The determining figure in the size of this type of generator as well as more conventional generators, is the ampere-turns of armature reaction per unit circumferential length of armature surface which may be created by generator loading and successful commutation still achieved.

Accordingly, this invention provides a multiple output generator so arranged that the practical limitation of armature reaction ampere-turns per unit circumferential length of armature surface is greatly reduced for a given size machine, and further provides a new and improved commutating pole or interpole coil arrangement for multiple output generators which provides successful commutation within the usual limits of maximum load regardless of the loading on the various circuits.

It is an object of this invention to provide a new and improved multiple output generator having armature reaction and commutating pole compensation which allows an increase in the rating of such machines for a given size.

It is another object of this invention to provide a new and improved multiple output generator wherein the output circuits are so arranged relative to one another that the armature reaction of the heaviest loaded output circuit does not become a limiting factor on the minimum size of the generator.

It is a further object of this invention to provide a new and improved multiple output generator which eliminates undesirable effects of voltages of mutual inductance on commutation due to inductive coupling of coil sides occupying the same slot where the currents in the coils are not of the same magnitude.

Briefly stated, the invention in one form thereof comprises a triple output generator wherein two outputs are taken from adjacent brushes and the largest output is taken from diametrically opposite brushes. This arrangement allows construction of a multiple output generator of a higher rating for a given frame size by averaging the armature reaction ampere-turns per unit circumferential length of armature surface of the loaded generator output circuits. The invention further provides a commutating pole winding arrangement which makes successful commutation of armature coils wholly independent of the loads on the different generator output circuits.

The features of the invention which are believed to be novel are pointed out with particularity in the claims appended to and forming part of this specification. The invention, however, both as to its organization and operation, together with further objects and advantages thereof, may best be understood from the following description taken in conjunction with the drawings wherein:

Figure 1:
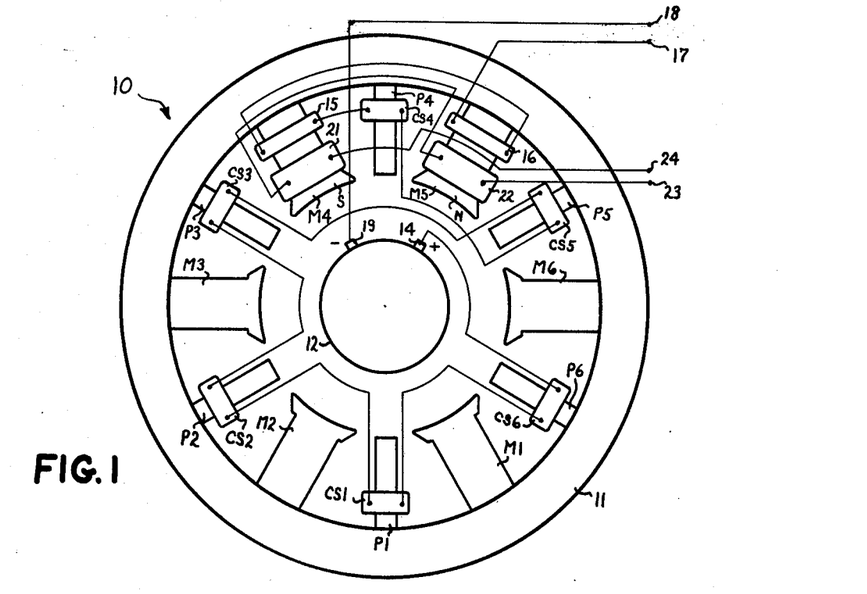
FIGS. 1 and 2 illustrate a triple output direct current generator which may embody the invention.
Figure 2:
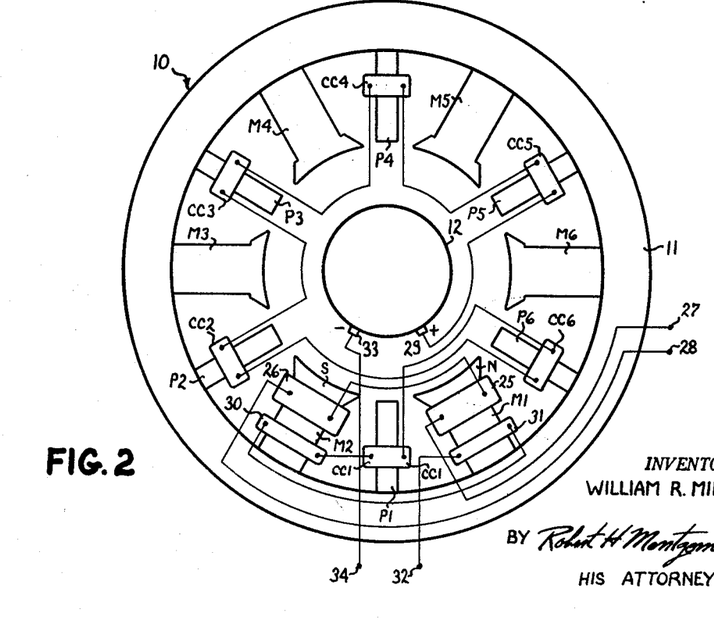
Figure 3:
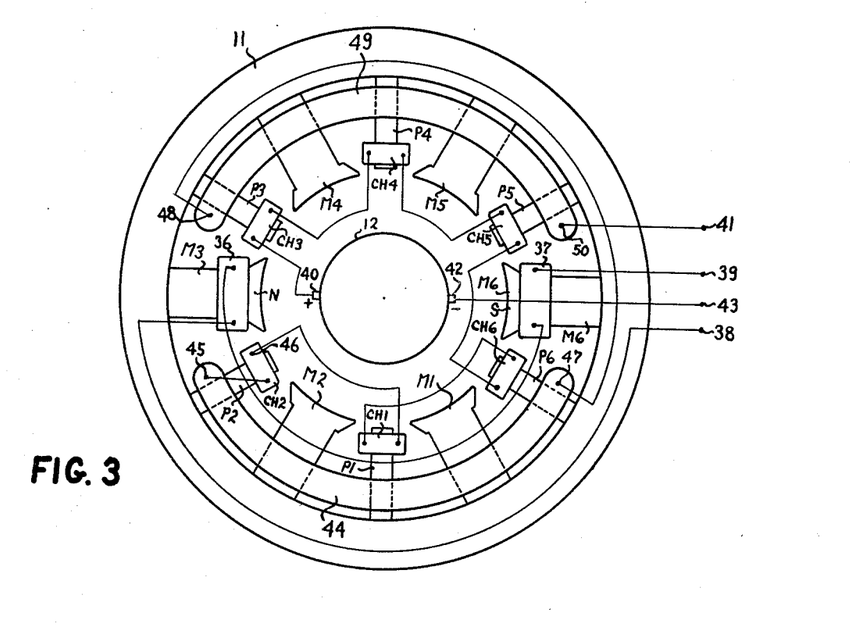
FIG. 3, together with FIGS. 1 and 2, illustrate a triple output generator arrangement embodying the invention.

Reference is now made to FIGS. 1, 2 and 3, which illustrate a triple output generator embodying the invention. For clarity of illustration, each of FIGS. 1, 2 and 3 illustrate one of the three electrical circuits of a triple output generator embodying the invention. The magnetic structure of FIGS. 1, 2 and 3 are identical, and it will be understood that in practice the electrical circuits of the figures are combined on a single magnetic frame, common to all of these figures. The generator, hereinafter disclosed, has a lap-wound armature without equalizer connections inasmuch as the plurality of output circuits are designed to produce independent voltages.

Referring now to FIG. 1, a multiple output generator 10 is illustrated which comprises a magnetic frame or yoke member 11 having a plurality of equally spaced main poles M1, M2, M3, M4, M5 and M6 extending inwardly therefrom and defining an air gap with armature 12. Equally spaced between adjacent main poles are commutating poles or interpoles P1, P2, P3, P4, P5 and P6. In the circuit of FIG. 1, each of the interpoles P1–P6 has a commutating coil CS1–CS6, respectively, thereon, each of said commutating coils having a predetermined number of turns, as hereinafter disclosed. The armature 12 is lap-wound having top and bottom coil sides in each slot therein, as more fully described in conjunction with FIG. 4. The generator output circuit illustrated in FIG. 1 may be traced from positive brush 14, which is disposed beneath main pole M5 on commutator 13, FIG. 4, to commutating coils CS6, CS1, CS2, CS3 and CS5 successively on interpoles P6, P1, P2, P3 and P5, respectively, all of which are wound in the same polarity, and hence to commutating coil CS4, which is wound in opposite polarity with respect to the other commutating coils on interpole P4, and hence to armature reaction compensating windings 15 and 16 wound in the same polarity on main poles M4 and M5 respectively, and hence to positive output terminal 17. Negative armature terminal 18 is connected to negative brush 19 under pole M4. Terminals 17 and 18 are adapted to be connected to a load, which may be a motor 20, FIG. 4, adapted to control one degree of motion of a shovel or crane. For future clarity of reference, the circuit of FIG. 1 will be referred to as the "swing" circuit. Main field exciting coils 21 and 22 are provided on main poles M4 and M5 respectively, in opposite magnetic polarity so that when these coils are excited from terminals 23 and 24 one of the main poles M4 or M5 will be a north magnetic pole and the other of the main poles M4 or M5 will be a south magnetic pole. In the arrangement as illustrated in FIG. 1, main pole M5 is normally a north (N) magnetic pole, and main pole M4 is normally a south (S) magnetic pole, as indicated by the letters N and S respectively. Terminals 23 and 24 are adapted to be connected to a source of controllable unidirectional energy, not shown, to excite coils 21 and 22 to produce magnetic flux of controllable magnitude therebetween through the armature core and the yoke 11, and upon rotation of the armature a voltage will be induced in the armature coil sides passing beneath the poles M4 and M5.

FIG. 2 illustrates another circuit of generator 10 which comprises commutating coils CC1, CC2, CC3, CC4, CC5 and CC6 on interpoles P1–P6, respectively. Field exciting windings 25 and 26 on main poles M1 and M2 respectively are so wound and connected that when they are energized from terminals 27 and 28 connectable to a source of direct current energy of controllable magnitude that one of the main poles M1 or M2 is established as a north magnetic pole, and the other of main poles M1 or M2 as a south magnetic pole. In the arrangement illustrated in FIG. 2, when terminal 28 is positive, main pole M1 will be a north (N) magnetic pole and main pole M2 will be a south (S) magnetic pole. The output circuit of FIG. 2 may be traced from positive brush 29 through commutating coils CC5, CC4, CC3, CC2 and CC6 successively on interpoles P5, P4, P3, P2 and P6 respectively, which are wound in the same magnetic polarity, and then to commutating coil CC1 on interpole P1 which is wound in opposite polarity to the other commutating coils. From commutating coil CC1, the output circuit continues to armature reaction compensating windings 30 and 31 on main poles M2 and M1 respectively, and hence to positive output terminal 32. Negative brush 33 is directly connected to output terminal 34. Output terminals 32 and 34 are connectable to an external load circuit which may be a motor 35, FIG. 4, which may control, for example, a motion of a shovel or crane. For future clarity of reference, the circuit of FIG. 2 will be referred to as the "crowd" circuit.

It will be noted in FIGS. 1 and 2 that the electrical circuits illustrated therein are associated with adjacent brushes. It will be further noted that the circuit of FIG. 2 is the mirror image of that of FIG. 1 with respect to its associated main poles and brushes. A multiple output generator embodying one aspect of the invention hereinafter explained, could be constructed having each external circuit taken from pairs of adjacent brushes, in which case each of the three generator circuits would be the same, and the circuits shown in either FIG. 1 or 2 would be repeated on each pair of adjacent poles and associated brushes.

However, in accordance with one aspect of the invention, it is preferred to supply one external load circuit from non-adjacent brushes on the commutator, as illustrated in FIG. 3. In FIG. 3, flux-producing windings 36 and 37 are placed about main poles M3 and M6 respectively. Windings 36 and 37 are connected in series to field terminals 38 and 39 in such manner that when terminal 39 is positive with respect to terminal 38, main pole M3 is of north (N) magnetic polarity, and main pole M6 is of south (S) magnetic polarity. Commutating coils CH1, CH2, CH3, CH4, CH5 and CH6 are placed about interpoles P1, P2, P3, P4, P5 and P6 respectively, in series between positive brush 40 and output terminal 41. Negative brush 42 is connected to output terminal 43. Commutating coils CH3, CH4, and CH5 are serially connected in one magnetic polarity and commutating coils CH6, CH1 and CH2 are connected in the opposite magnetic polarity. An armature reaction compensating coil 44 has one terminal 45 thereof connected to terminal 46 of commutating coil CH2. Armature reaction compensating coil 44 is placed about interpoles P6 and P2 and includes therein main poles M1 and M2 and interpole P1. A second terminal 47 of armature reaction compensating coil 44 is connected to terminal 48 of a second armature reaction compensating coil 49, which is placed about commutating poles P3 and P5 and includes therein main poles M4 and M5 and interpole P4. The second terminal 50 of compensating coil 49 is connected to armature output terminal 41. Output terminals 41 and 43 are adapted to have an external load circuit connected thereto which may comprise a motor 51 adapted to control, for example, movement of a shovel or crane. In practice, a generator embodying the invention is used so that the external load circuit demanding the greatest power output from generator 10 is connected across terminals 41 and 43, and therefore the diametrically opposite brushes 40 and 42 under main poles M3 and M6 respectively. The circuit of FIG. 3, for future clarity of reference, will be referred to as the "hoist" circuit.

Figure 4:
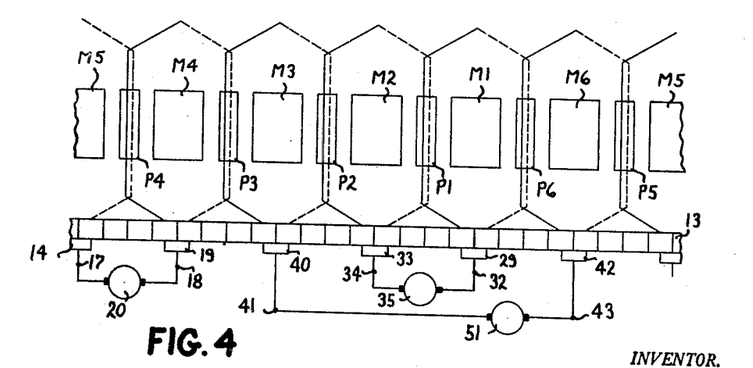
FIG. 4 is illustrative of the type of armature winding of a generator constructed in accordance with the invention and the loading of such generator.

FIG. 4 depicts a development of the windings on armature 12 and illustrates the armature as being of the lap-wound type having upper and lower coil sides in each armature slot, not shown. In FIG. 4, the lower coil sides in an armature slot are depicted by the dashed lines. For simplicity of illustration, only the coils having sides under the interpoles P1–P6 are illustrated. However, it is to be understood that other coil groups will be placed on the armature 12 in accordance with the design requirements of the generator, and the armature may be wound with several coils per armature slot. FIG. 4 also illustrates the loading of the output circuits of FIGS. 1–3 with the motors 20, 35 and 51. For simplicity of illustration, the commutating coils and armature reaction compensating windings are not shown in FIG. 4.

It is quite well known that a limiting factor on the output rating of a direct current generator is the ampere-turns of armature reaction per circumferential length (usually "per inch") of armature surface. This factor places a limit on the commutating ability of a generator.

However, by placing the largest load on the diametrically opposite brushes, the ampere-turns per inch of armature reaction between brushes 40 and 42 is much smaller in magnitude than if the generator were constructed to have the largest output taken from adjacent brushes under adjacent main poles.

This will become apparent from an inspection of FIGS. 5a-5d, which represent the ampere-turns of armature reaction produced by the circuits when loaded. In a power shovel application, the hoist circuit on brushes 40 and 42 will usually be rated to carry twice as much current as the other two circuits, and since the brushes on either side of the hoist circuit brushes carry the smaller of the load currents, only one coil under each communicating pole is required to communicate the large hoist current. By virtue of the generator having the circuit adapted to supply the heaviest load (hoist) connected across the diametrically opposite brushes 40, 42, the ampere-turns of armature reaction per inch limit of successful commutation is applied to the average of the hoist and swing circuit armature reaction ampere-turns and the average of the hoist and crowd circuit armature reaction ampere-turns. If the three outputs were taken from adjacent brushes, the ampere-turns per inch of armature surface limit would be applied to the circuit having the highest loading, and therefore the total rating of the machine would be three times the rating of the highest loaded circuit. However, in the generator having the largest load connected across diametrically opposite brushes as illustrated, the total rating of the generator will be three times the average of the two circuits carrying the two heaviest loads. Therefore, the generator construction of FIGS. 1-3 permits a more compact machine for a given total rating of the three circuits.

Figure 5A:
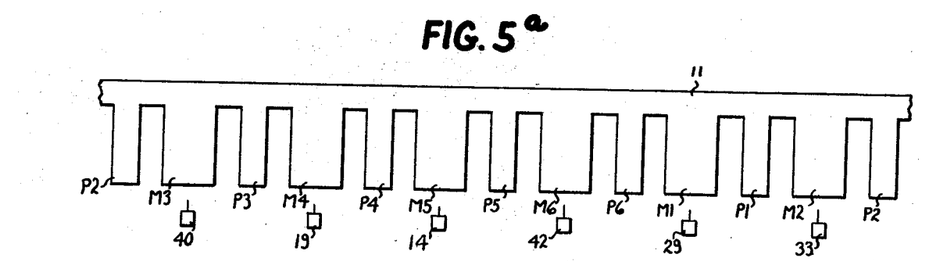
FIGS. 5a, 5b, 5c and 5d illustrate the armature reaction flux distribution of a generator constructed in accordance with the invention and aid in pointing out one of the advantages thereof.
Figure 5B:
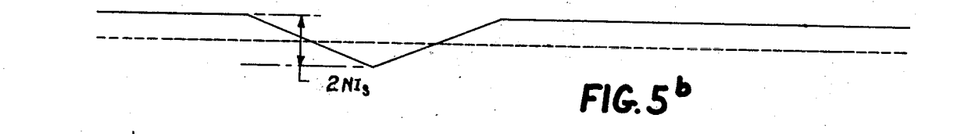
Figure 5C:
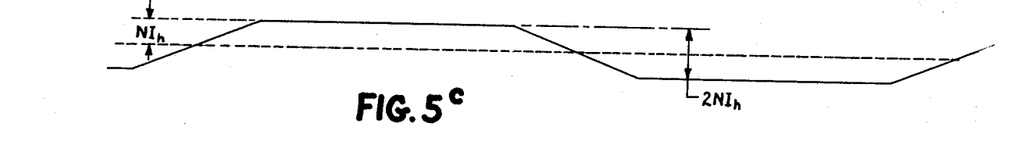
Figure 5D:
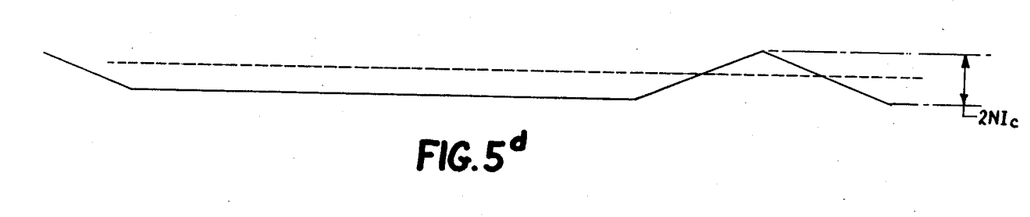

FIGS. 5a-5d graphically illustrate the armature reaction due to loading the three circuits of the generator of FIGS. 1-4. The field structure including main poles M1-M6 and interpoles P1-P6 are shown in FIG. 5a in a developed arrangement together with brushes 14, 19, 29, 33, 40 and 42. FIG. 5b represents the distribution of armature reaction ampere-turns ($NI_s$) under the stator structure produced by current in armature coils having sides between brushes 14 and 19 of the swing circuit. FIG. 5c represents the distribution of armature reaction ampere-turns $NI_h$ produced by current in armature coils having coil sides between brushes 40 and 42 of the hoist circuit. FIG. 5d represents the distribution of armature reaction ampere-turns $NI_c$ produced by current in coils having coil sides between brushes 29 and 33.

It will be noted that the armature reaction flux $NI_s$, due to loading of the swing circuit brushes, will cause flux to flow into main poles M3, M6, M1 and M2, and flux will return to the armature through main poles M3 and M4. This unsymmetrical distribution of magnetomotive force (M.M.F.) gives the frame 11 a bias of $\frac{1}{3} NI_s$ in the frame relative to the armature over two-thirds of its periphery. Likewise, the armature reaction flux $NI_c$, due to loading of the crowd circuit brushes, enters frame 11 through main poles M1 and M2 and exits therefrom through main poles M3, M4, M5 and M6 and thereby establishes a magnetic bias of $-\frac{1}{3} NI_c$ in the frame relative to the armature. The armature reacttion flux $NI_h$ set up by loading of the hoist circuit is seen to be symmetrical in form and it therefore produces no magnetic bias of the frame relative to the armature.

The armature reaction flux due to the loading of the swing and crowd circuits would result in some net magnetic bias on the stator relative to the armature and produce interatcion between the various circuits due to the bend in the saturation curve, not shown. This magnetic bias on the stator structure would tend to make north magnetic poles more north and south magnetic poles less south, or vice versa, and would not effect the total flux of a particular field circuit. However, due to the bend in the saturation curve of the stator iron, the magnetic bias might produce unequal magnetic changes in respective north and south poles of a second magnetic circuit and affect the voltage output of that circuit. To "buck out" this armature reaction flux, series turns, windings 15 and 16 are placed on main poles M4 and M5 of the swing circuit, FIG. 1, and series turns, windings 30 and 31, are placed on main poles M1 and M2 of the crowd circuit, FIG. 2. To compensate for the amature reaction due to loading of the hoist circuit, FIG. 3, series turns, coils 44 and 49, are provided as pointed out in conjunction with FIG. 3. The armature reaction compensation windings 15, 16, 30, 31, 44 and 49 thus eliminate voltage interaction between the various circuits due to armature reaction.

A multiple output generator, for most efficient operation, must have all circuits independent even though the various circuits share magnetic portions of the generator. The construction so far described eliminates voltage interaction due to armature reaction flux produced by the various circuits when loaded. However, successful commutation of the current in the armature coils presents a considerable problem.

Each commutating pole or interpole P1-P6 has a commutating coil CS1-CS6, CC1-CC6 and CH1-CH6, all respectively, thereon for each of the output circuits. In accordance with another aspect of the invention, the commutating coils are selected, not only to cancel the voltage of self-induction of the coils to allow successful commutation, but also to cancel out any voltage due to mutual inductance of coil sides sharing the same armature slot.

Figure 6:
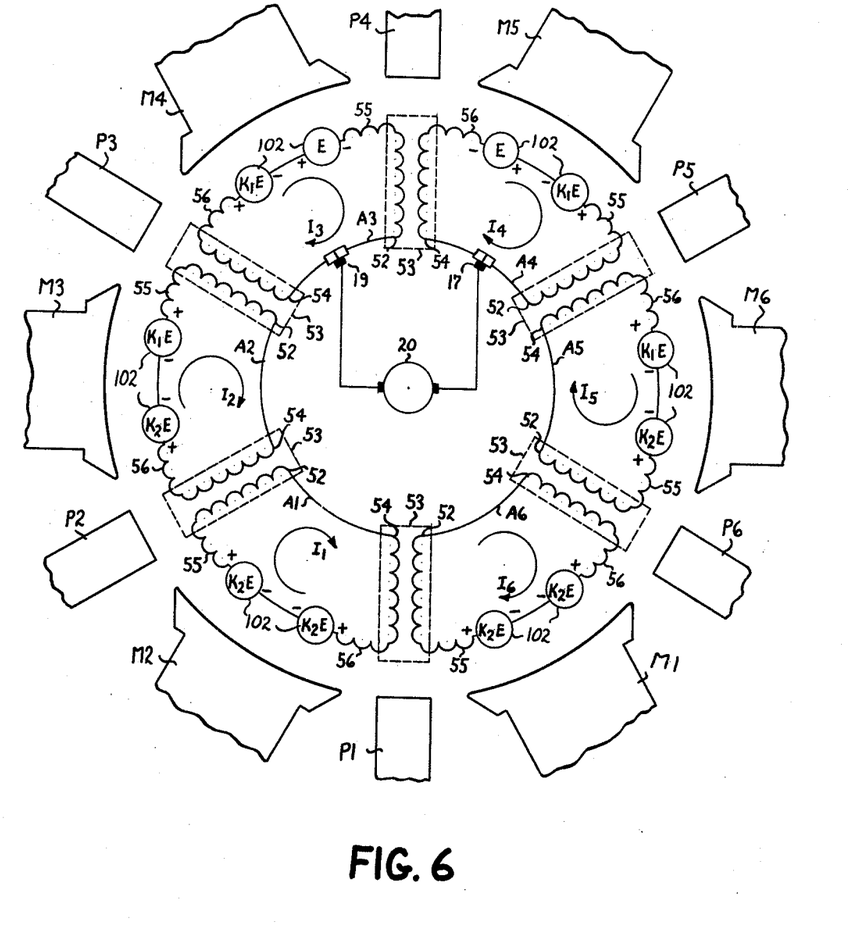
FIGS. 6 and 7 are diagrams, partly schematic, of a multiple output generator, and aid in a mathematical explanation of the manner in which interpole windings are selected in accordance with the invention.

At any instant, there are six coil groups distributed about the armature that are short circuited by the brushes. This is schematically represented in FIG. 6 by coils A1-A6. Each of the coils A1-A6 are identical, and as represented by coil A1, has a first coil side 52 as the top conductor in an armature slot 53 and a second coil side 54 as the bottom conductor in another armature slot. The progression of a lap armature winding is well known to those skilled in the art, and no further description of the positioning of armature coils A1-A6 need be made. For obvious reasons, all armature slots are of the same dimension, and all coils are formed of conductors of the same dimension and cross section. The inductances 55 represent the self-inductance $L_1$ of all lower coil sides in the slots, and the inductances 56 represent the self-inductance $L_2$ of all upper coil sides in the slots. The coil sides commonly occupying an armature slot, for example, the coil sides 52 and 54 of coils A1 and A2 beneath interpole P2, are drawn as a coupled circuit to represent the mutual inductance M between coil sides occupying the same slot. The small generators 102, two of which are shown in each of coils A1-A6, represent the voltages induced therein by the associated interpoles and have polarities as hereinafter pointed out.

Assume that the coils A1-A6 have currents $I_1$-$I_6$ therein respectively, and assume further that two of the coils A3, A4 are associated with a circuit which is loaded, for example, the swing circuit of FIG. 1, loaded with motor 20 as exemplified in FIG. 6.

The interpoles and windings thereon will now be examined to explain what is required to commutate the currents $I_3$ and $I_4$ in armature coils A3 and A4 respectively. The three interpoles P3, P4 and P5 immediately associated with coils A3 and A4 produce fluxes which generate voltages in these coils. Also there is a mutual term due to the magnetic coupling between coils A2 and A3, and A4 and A5, due to each pair of these coils having coil sides in common slots. In each of the adjacent coils A2 and A5, it will be assumed that the current is not changing (no-load on their brushes) and the net voltage generated by the flux of interpoles P3 and P5 must exactly cancel the voltage of mutual inductance induced in coils A3 and A4 where the current is changing.

If it is assumed that the commutating coil CS4 of the swing circuit on interpole P4 is to be of one polarity, then the commutating coils CS3 and CS5 to be placed on interpoles P3 and P5 respectively, must be wound in the opposite polarity so that the voltage induced by the flux of poles P3 and P5 are additive, with the flux of pole P4, in commutating current in armature coils A3 and A4.

Commutating coil CS6, to be placed on interpole P6, will be wound in the same polarity as coil CS5 so that the voltages induced by the flux of these poles in coil A5 will act in opposition to the change of current $I_5$. The difference in the number of turns of commutating coils CS5 and CS6 must be just sufficient to compensate for the voltage induced in coil A5 by change of current $I_4$ in coil A4 with which coil A5 shares an armature slot. If this condition is fulfilled, current $I_5$ will not have a tendency to change with current $I_4$.

These remarks with respect to commutating coils CS5 and CS6 on interpoles P5 and P6 also apply to commutating coils CS2 and CS3 on interpoles P2 and P3 respectively. Commutating coil CS1 on interpole P1 must be wound in the same polarity and have the same number of turns as commutating coils CS2 and CS6, since the flux from interpoles P1, P2 and P6 taken together produce no net voltage in armature coils A1 and A6 tending to change $I_6$ and $I_1$.

In view of the foregoing discussion, it may be seen that commutating coil CS4 is wound in a first polarity which is assumed to be south, and commutating coils CS1, CS2, CS3, CS5 and CS6 are wound in the opposite polarity, and the flux produced by these coils will generate voltages in coils A1–A6 of the polarities shown in FIG. 6 by the generators 102.

The currents $I_1$–$I_6$, under the conditions assumed, may be simultaneously expressed by the equations set forth below.

In the simultaneous equations set forth below, the terms $K_1E$ and $K_2E$ represent the voltage desired to be induced in the armature conductors by flux of interpoles P3 and P5, and P1, P2 and P6 respectively, in coils beneath these poles as a percent of the voltage E induced in the armature conductors by the flux of commutating pole P4.

The change of the currents $I_1$–$I_6$ in each of coils A1–A6 respectively under the conditions specified may be expressed as:

(1) $$M\frac{dI_6}{dt} + M\frac{dI_2}{dt} = (L_1 + L_2)\frac{dI_1}{dt}$$

(2) $$M\frac{dI_1}{dt} + (K_1 - K_2)E_1 + M\frac{dI_3}{dt} = (L_1 + L_2)\frac{dI_2}{dt}$$

(3) $$M\frac{dI_2}{dt} - (K_1 + 1)E_1 + M\frac{dI_4}{dt} = (L_1 + L_2)\frac{dI_3}{dt}$$

(4) $$M\frac{dI_3}{dt} + (K_1 + 1)E_1 + M\frac{dI_5}{dt} = (L_1 + L_2)\frac{dI_4}{dt}$$

(5) $$M\frac{dI_4}{dt} - (K_1 - K_2)E_1 + M\frac{dI_6}{dt} = (L_1 + L_2)\frac{dI_5}{dt}$$

(6) $$M\frac{dI_5}{dt} + M\frac{dI_1}{dt} = (L_1 + L_2)\frac{dI_6}{dt}$$

Assuming only the brushes that are commutating currents $I_3$ and $I_4$ are loaded, then (7) $$\frac{dI_1}{dt} = \frac{dI_2}{dt} = \frac{dI_5}{dt} = \frac{dI_6}{dt} = 0$$

and, Equation 2 reduces to (8) $$(K_1 - K_2)E_1 = M\frac{dI_3}{dt}$$

Equation 3 reduces to (9) $$-(K_1 + 1)E_1 = -M\frac{dI_4}{dt} + (L_1 + L_2)\frac{dI_3}{dt}$$

Equation 4 reduces to (10) $$(K + 1)E_1 = -M\frac{dI_3}{dt} + (L_1 + L_2)\frac{dI_4}{dt}$$

and Equation 5 reduces to (11) $$-(K_1 - K_2)E_1 = -M\frac{dI_4}{dt}$$

substituting (8) and (11) in (9) or (10) gives (12) $$(K_1 + 1)E_1 = (K_1 - K_2)E_1 + (L_1 + L_2)\frac{(K_1 - K_2)}{M}E_1$$

dividing by $E_1$ and subtracting $K_1$ from both sides gives (13) $$1 = -K_2 + \frac{(L_1 + L_2)(K_1 - K_2)}{M}$$

and (14) $$\frac{1 + K_2}{K_1 - K_2} = \frac{L_1 + L_2}{M}$$

Since interpole P4 is to be of one magnetic polarity and the others of the opposite polarity, and the flux out (2E) of the commutating poles must equal the flux in $(6K_2E + 4K_1E)$ as shown in FIG. 6, then, $$6K_2E + 4K_1E = 2E$$

which dividing by 2E reduces to (15) $$3K_2 + 2K_1 = 1$$

From transformer theory, (16) $$M = K_c\sqrt{L_1 L_2}$$

where $K_c$ is the coefficient of coupling, substituting (16) and (14), gives (17) $$\frac{1 + K_2}{K_1 - K_2} = \frac{\sqrt{\frac{L_1}{L_2} + \frac{L_2}{L_1}}}{K_c} = X$$

where X is a constant determined by machine dimensions. Then substituting (15) into (17) and solving for $K_1$ and $K_2$ gives (18) $$K_1 = \frac{X + 4}{5X + 2}$$

and (19) $$K_2 = \frac{X + 2}{5X + 2}$$

Figure 7:
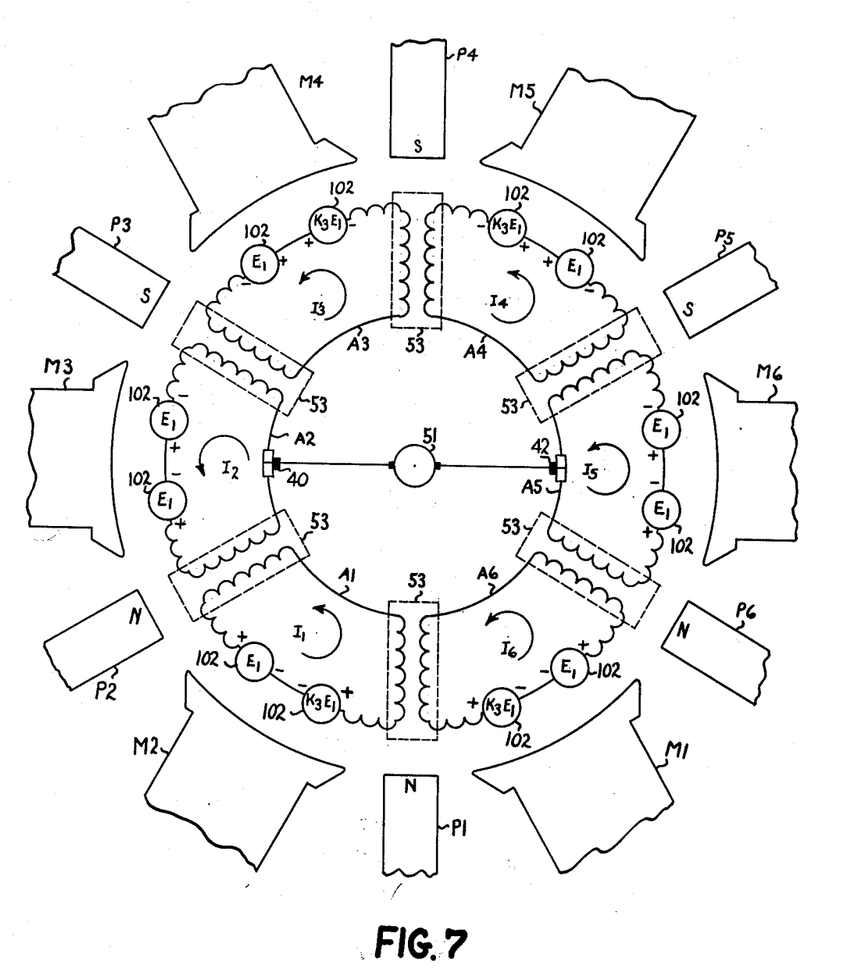

Reference is now made to FIG. 7 for disclosure of the manner in which the turns of commutating coils CH1–CH6 are selected. In FIG. 7, like identifying references as those of FIG. 6, identify like elements. Let it be assumed that the armature coils A2 and A5 are loaded, as exemplified by motor 51, and the currents $I_2$ and $I_5$ are being commutated and currents $I_1$, $I_3$, $I_4$ and $I_6$ in armature coils A1, A3, A4 and A6 respectively do not change.

Interpoles P2 and P3 must be of opposite polarity so that the voltages induced by the flux of these poles in armature coil A2 are additive in commutating current $I_2$. Likewise, interpoles P5 and P6 must be opposite polarity so that the voltages induced by these poles in armature coil A5 are additive in commutating current $I_5$.

Interpoles P1 and P2 are of the same polarity so that the voltage induced by the flux of these poles in armature coil A1 act to oppose change of current $I_1$. The differences in turns commutating coils CH1 and CH2 to be placed on interpoles P1 and P2 must be just sufficient to compensate for voltage induced in coil A1 by change in current $I_2$ in armature coil A2. If this condition is satisfied, current $I_1$ will not have a tendency to change with change in $I_2$. The same remarks apply to interpoles P3, P4; P4, P5; and P6, P5.

If the conditions set forth above are met, the voltages induced in the armature coils A1–A6 by the flux of interpoles P1–P6 will be of such magnitude to provide successful commutation as the various generator outputs are loaded. From the foregoing discussion, it may be seen that the interpoles P1–P6 of FIG. 7 will have polarities, due to hoist circuit commutating coils CH1–CH6, as exemplified by the references N and S, and the voltages $E_1$ and $K_3E_1$ induced thereby in the respective armature coils A1–A6, as represented by the generators 102, will have polarities, as exemplified by the illustrative generators 102.

Where the generator is aranged as shown in FIGS. 1, 2 and 3, the turns on the interpoles of the hoist circuit may be determined in a similar manner, as shown in conjunction with FIG. 6 for the swing circuit. Reference is now made to FIG. 7 with the assumption that the hoist circuit is loaded, as exemplified by motor 51, and the currents $I_2$ and $I_5$ in armature coils A2 and A5 are being commutated and the currents $I_1$, $I_3$, $I_4$ and $I_6$ in coils A1, A2, A3 and A4 respectively do not change. Let $E_1$ be the voltage to be generated by the flux of interpoles P2, P3, P5 and P6 in coils adjacent thereto, and $K_3E_1$ the voltage required to be generated by the flux of interpoles P4 and P1, as illustrated in FIG. 7, then (20) $M\frac{dI_6}{dt}+(K_3-1)E_1+M\frac{dI_2}{dt}=(L_1+L_2)\frac{dI_1}{dt}$ (21) $M\frac{dI_1}{dt}+2E_1+M\frac{dI_3}{dt}=(L_1+L_2)\frac{dI_2}{dt}$ (22) $M\frac{dI_2}{dt}+(K_3-1)E_1+M\frac{dI_4}{dt}=(L_1+L_2)\frac{dI_3}{dt}$ (23) $M\frac{dI_3}{dt}+(1-K_3)E_1+M\frac{dI_5}{dt}=(L_1+L_2)\frac{dI_4}{dt}$ (24) $M\frac{dI_4}{dt}+(-2E_1)+M\frac{dI_6}{dt}=(L_1+L_2)\frac{dI_5}{dt}$ (25) $M\frac{dI_5}{dt}+(1-K_3)E+M\frac{dI_1}{dt}=(L_1+L_2)\frac{dI_6}{dt}$ and (26) $\frac{dI_1}{dt}=\frac{dI_3}{dt}=\frac{dI_4}{dt}=\frac{dI_6}{dt}=0$ from (20) or (22)

(27) $(K_3-1)E_1+M\frac{dI_2}{dt}=0$ from (21)

(28) $2E_1=(L_1+L_2)\frac{dI_2}{dt}$ from (23) or (25)

(29) $(1-K_3)E_1+M\frac{dI_5}{dt}=0$ from (24)

(30) $-2E_1=(L_1+L_2)\frac{dI_5}{dt}$ adding (27) and (28) or (29) and (30)

(31) $K_3-1=\frac{2M}{L_1+L_2}$, but $M=K_c\sqrt{L_1L_2}$ therefore, (32) $K_3=1-\frac{2K_c}{\sqrt{\frac{L_1}{L_2}}+\sqrt{\frac{L_2}{L_1}}}$ Therefore, the flux from interpoles P1 and P4 must induce a voltage of $K_3E_1$ in coils A3, A4 and A1, A6 respectively.

Inasmuch as the commutating coils CH1–CH6 of the hoist circuit, FIG. 3, all carry the same current, if the number of turns of the commutating coils CH2, CH3, CH4 and CH6 required on interpoles P2, P3, P5 and P6 respectively, is determined to be $N_h$, the number of turns of coils CH1 and CH4 on interpoles P1 and P4 will be $K_3N_h$.

On the generator of FIGS. 1–3, the number of turns of each commutating coil would be

| Interpole | P1 | P2 | P3 | P4 | P5 | P6 |
|---|---|---|---|---|---|---|
| Swing Circuit CS1–CS6 | $K_2N_s$ | $K_2N_s$ | $K_1N_s$ | $-N_s$ | $K_1N_s$ | $K_2N_s$ |
| Crowd Circuit CC1–CC6 | $N_c$ | $-K_1N_c$ | $-K_2N_c$ | $-K_2N_c$ | $-K_2N_c$ | $-K_1N_c$ |
| Hoist Circuit CH1–CH6 | $-K_3N_h$ | $-N_h$ | $N_h$ | $K_3N_h$ | $N_h$ | $-N_h$ |

The values of $L_1$, $L_2$ and M of Equations 18 and 19 may be determined from calculation using the machine dimensions and design parameters, or may be derived from measurement of machine characteristics and the values of $K_1$ and $K_2$ then calculated. For purposes of illustration, a graphical technique of determining the required commutating coil turns will be presented.

Figures 8, 9:
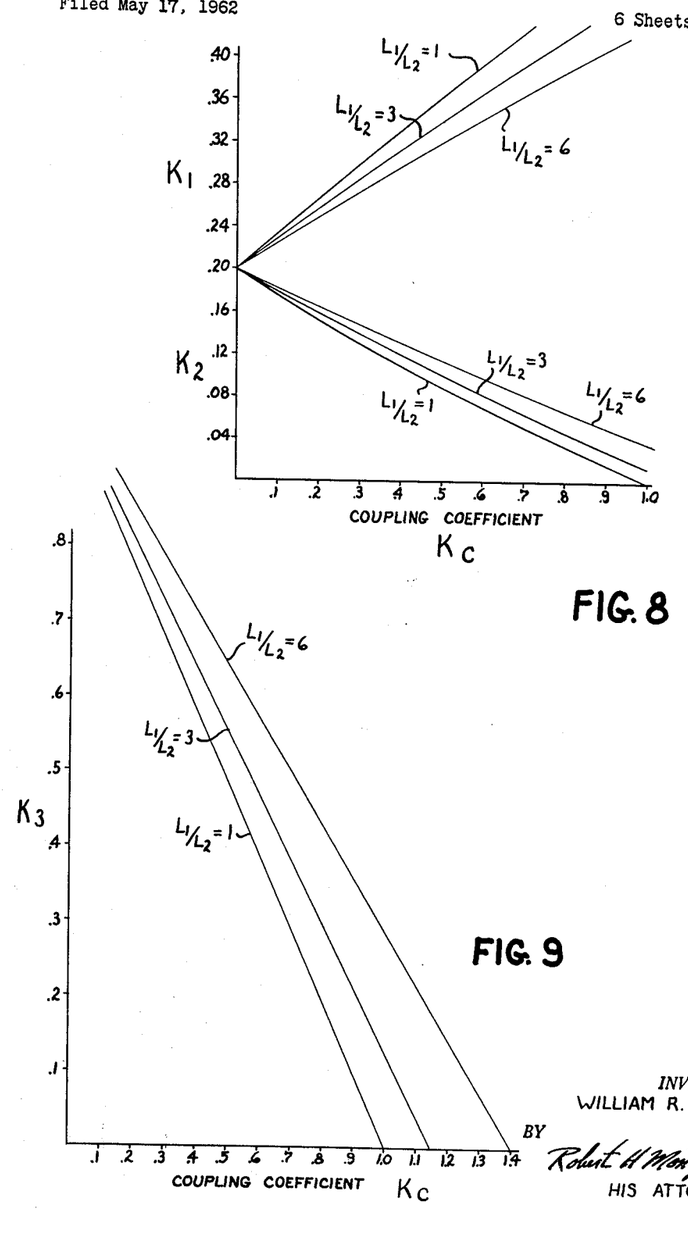
FIGS. 8 and 9 are curves of interpole excitation versus coefficient of magnetic coupling for a generator, and aid in determination of commutating coil turns.

FIG. 8 illustrates, from Equations 18 and 19, a plot of $K_1$ and $K_2$ versus the coefficient of coupling $K_c$ for various ratios of $L_1/L_2$, and FIG. 9 illustrates from Equation 33 a plot of $K_3$ versus the coefficient of coupling $K_c$ for various ratios of $L_1/L_2$.

From the foregoing, the ratios of the turns of the different commutating coils of each output circuit are known. To determine the number of turns on each pole, let it be assumed that the currents in each of the output circuits of FIGS. 1, 2 and 3 are equal and the polarities of the main poles M1–M6 are as stated in the description of these figures, then the relative polarities of the commutating coils will be as shown on the foregoing tabulation. The generator 10 under these circumstances behaves like a conventional 6-pole direct current generator, and the turns of the commutating coils required to force commutation (over and above those needed simply to overcome armature reaction) should be between .2 and .4 of the armature reaction ampere-turns. This range of commutating ampere-turns is well known to those skilled in the art and is commonly used in the design of direct current machinery.

The net number of commutating coil turns on interpole P3 is (32) $K_1N_s-K_2N_c+N_h=(.2-.4)N_a$ where $N_a$ is the number of armature ampere-turns. Inasmuch as all of the three load currents are equal, the current term I need not be considered. The net number of commutating coil ampere-turns on interpole P4 is (33) $-N_s-K_2N_c+K_3N_h=-(.2-.4)N_a$ multiplying (33) by minus one gives (33a) $N_s+K_2N_c-K_3N_h=(.2-.4)N_a$ From the plots FIGS. 8 and 9, of Equations 18, 19 and 32, which relate $K_1$, $K_2$ and $K_3$ to the leakage inductances $L_1$ and $L_2$ and coupling coefficient $K_c$, appropriate values of $K_1$, $K_2$ and $K_3$ can be determined.

For example, if the coupling coefficient $K_c$ of a particular machine is determined to be 0.5 and the ratio of the leakage or self-inductances $L_1/L_2$ is 3, then from FIGS. 8 and 9, $K_1=.34$, $K_2=.11$ and $K_2=.56$.

Substituting these values of $K_1$, $K_2$ and $K_3$ in Equations 32 and 33 gives (34) $.34N_s-.11N_c+N=.3N_a$ (35) $N_s+.11N_c-.56N=.3N_a$ since $N_s=N_c$ (36) $.23N_s+N_h=.3N_a$
$1.11N_s-.56N_h=.3N_a$ Solving for $N_s$ gives (37) $N_s=.38N_a=N_c$ then (38) $N_h=.21N_a$ If the equivalent armature turns per pole are 30, the $N_s=11.4$, $N_c=11.4$ and $N_h=6.1$, but in integral numbers $N_s=11$, $N_c=11$, and $N_h=6$; and $K_1N_s=K_1N_c=4$; $K_3N_h=3$; $K_2N_s=K_2N_c=1$.

By reverse calculation for an integral number of coil turns $K_1=0.36$, $K_2=0.091$, and $K_3=0.5$.

This is as close as the number of turns of the commutating coils may be selected in integer numbers. The discrepancy between the integer number of turns and the ideal values may, if desired, be compensated for by adjustment of the air gaps beneath the interpoles.

In describing the invention, reference has been made to the self-inductance of upper and lower coil sides in a common armature slot. It is to be understood that machines may be made with several coils per slot, in which case there may be a plurality of lower coil sides and a like plurality of upper coil sides in each slot. In such cases, the self-inductances of all lower coil slides are identified as $L_1$ and the self-inductances of all upper coil sides are identified as $L_2$, in accordance with the foregoing equations.

While the output circuit arrangement of a multiple output generator embodying the invention and the commutating coil arrangement has been most specifically disclosed in a triple output generator, it is to be understood that the invention is not limited to the disclosed construction or application. For example, the commutating coil selection would be applicable to a multiple output generator having all outputs taken from adjacent brush terminals with adjacent main poles for each output circuit. If a multiple output generator were to be constructed having four or more output circuits, the higher rated outputs could be taken from brush pairs which were not adjacent, while the lower rated ouputs could be taken from adjacent brush pairs.

It is therefore intended to cover in the appended claims all embodiments of the invention and modifications thereto which do not depart from the spirit and scope of the invention.

What is claimed as new and is desired to be secured by Letters Patent of the United States is:

1. A direct-current generator for exciting a plurality of external circuits comprising: a lap-wound armature without equalizer connections; three pairs of main poles arranged to co-act with said armature; interpoles disposed adjacent each main pole so that there are as many interpoles as main poles; a pair of brushes for each pair of main poles for taking three external circuits off from said armature, two of said external circuits being taken from pairs comprising adjacent brushes and the third external circuit being taken from brushes diametrically opposed on said armature; and three separate windings associated respectively with the three external circuits disposed on each of said interpoles, an interpole winding of each of the circuits taken from adjacent brushes having substantially N commutation-forcing ampere-turns of a first polarity, the windings of each adjacent interpole having substantially $K_1N$ commutation-forcing ampere-turns of the opposite polarity, and the remaining interpoles having substantially $K_2N$ commutation-forcing ampere turns of a polarity opposite said first polarity while the interpole windings of the external circuit taken from the diametrically opposed brushes have substantially $N_1$ commutation-forcing ampere-turns on the interpoles on either side of each of said opposed brushes and substantially $K_3N_1$ commutation-forcing ampere-turns on the other interpoles, the windings on the interpoles on either side of each of said opposed brushes being of opposite polarity and said other interpole windings being of the polarity of the interpole windings on interpoles adjacent thereto where:

$K_1$ and $K_2$ are percentages of N
$K_3$ is a percentage of $N_1$ $$K_1 = \frac{x+4}{5x+2}$$

$$K_2 = \frac{x-2}{5x+2}$$

$$K_3 = 1 - \frac{2K_c}{\sqrt{\frac{(L_1)}{(L_2)} + \frac{(L_2)}{(L_1)}}}$$

$$X = \frac{\sqrt{\frac{(L_1)}{(L_2)} + \frac{(L_2)}{(L_1)}}}{K_c}$$

$L_1$ and $L_2$ are the self inductances of the lower and upper coil sides in an armature slot, and $K_c$ is the coefficient of coupling between said lower and upper coil sides in said slots.

2. A direct-current generator for exciting a plurality of external circuits comprising: a lap-wound armature without equalizer connections; three pairs of main poles arranged to co-act with said armature; interpoles disposed adjacent each main pole so that there are as many interpoles as main poles; a pair of brushes for each pair of main poles for taking three external circuits off from said armature, two of said external circuits being taken from pairs comprising adjacent brushes and the third external circuit being taken from brushes diametrically opposed on said armature; and three separate windings associated respectively with the three external circuits disposed on each of said interpoles, the interpole windings of the external circuit taken from the pair of diametrically opposed brushes having substantially N commutation-forcing ampere-turns on the interpoles on either side of said opposed brushes, and substantially $K_3N$ commutation-forcing ampere-turns on the other interpoles where:

$K_3$ is a percentage of N and equal to $$1 - \frac{2K_c}{\sqrt{\frac{(L_1)}{(L_2)} + \frac{(L_2)}{(L_1)}}}$$

$L_1$ and $L_2$ are the self inductances of the lower and upper coil sides in any armature slot, and $K_c$ is the coefficient of mutual inductance between said lower and upper coil sides in said slot, the windings on the interpoles on either side of each of said opposed brushes being of opposite polarity and said other interpole windings being of the polarity of the interpole windings on interpoles adjacent thereto.

3. A direct-current generator for exciting a plurality of external circuits comprising: a lap-wound armature without equalizer connections; a like number of main poles and interpoles arranged to co-act with said armature; a plurality of pairs of brushes one pair for each pair of main poles for taking said plurality of external circuits off from said armature; and a plurality of separate windings associated respectively with said external circuits disposed on each of said interpoles, an interpole winding associated with one of said external circuits having substantially N commutation-forcing ampere-turns of a first polarity, the windings of each of the interpoles adjacent thereto having substantially $K_1N$ commutation-forcing ampere-turns of the opposite polarity, and the windings on the remaining interpoles having substantially $K_2N$ commutation-forcing ampere-turns of said opposite polarity, where:

$K_1$ and $K_2$ are percentages of N $$K_1 = \frac{x+4}{5x+2}$$

$$K_2 = \frac{x-2}{5x+2}$$

$$X = \frac{\sqrt{\frac{L_1}{L_2} + \frac{L_2}{L_1}}}{K_c}$$

$L_1$ and $L_2$ = the self inductance of the lower and upper coil sides, respectively, in an armature slot and, $K_c$ = the coefficient of coupling between the lower and upper coil sides in said slots.

4. A direct-current generator for exciting a plurality of external circuits comprising: a lap-wound armature without equalizer connections; a like number of main poles and interpoles arranged to co-act with said armature; a plurality of pairs of brushes one pair for each pair of main poles for taking said plurality of external circuits off from said armature; and a plurality of separate windings associated respectively with said external circuits disposed on each of said interpoles, an interpole winding associated with each of said external circuits having substantially N commutation-forcing ampere-turns of a first polarity, the windings of each adjacent interpole having substantially $K_1 N$ commutation-forcing ampere-turns of the opposite polarity, and the remaining interpole windings having substantially $K_2 N$ commutation-forcing ampere-turns of said opposite polarity, where:

$K_1$ and $K_2$ are percentages of N $$K_1 = \frac{x+4}{5x+2}$$

$$K_2 = \frac{x-2}{5x+2}$$

$$X = \frac{\sqrt{\frac{L_1}{L_2}+\frac{L_2}{L_1}}}{K_c}$$

$L_1$ and $L_2$ = self inductance of the lower and upper coil sides in an armature slot, and $K_c$ = the coefficient of mutual inductance of said upper and lower coil sides in said armature slot.

5. A direct-current generator for exciting a plurality of external circuits comprising: a lap-wound armature without equalizer connections; a like number of main poles and interpoles arranged to co-act with said armature; a plurality of pairs of adjacent brushes one pair for each pair of main poles for taking said plurality of external circuits off from said armature; and a plurality of separate windings associated respectively with said external circuits disposed on each of said interpoles, an interpole winding associated with one of said external circuits having substantially N commutation-forcing ampere-turns of a first polarity, the windings of each adjacent interpole having substantially $K_1 N$ commutation-forcing ampere-turns of the opposite polarity, and the remaining interpole windings having substantially $K_2 N$ commutation-forcing ampere-turns of said opposite polarity, where:

$K_1$ and $K_2$ are percentages of N $$K_1 = \frac{x+4}{5x+2}$$

$$K_2 = \frac{x-2}{5x+2}$$

$$X = \frac{\sqrt{\frac{L_1}{L_2}+\frac{L_2}{L_1}}}{K_c}$$

$L_1$ and $L_2$ = self inductance of the lower and upper coil sides in an armature slot, and $K_c$ = the coefficient of mutual inductance of said upper and lower coil sides in said armature slot.

References Cited by the Examiner
UNITED STATES PATENTS

| | | | |
|---|---|---|---|
| 1,862,427 | 6/32 | Della Riccia | 310—141 |
| 1,967,159 | 7/34 | Pestarini | 323—13 |
| 2,003,688 | 6/35 | Hathaway | 318—105 |
| 2,049,348 | 7/36 | Bergman | 323—13 |
| 2,107,740 | 2/38 | Pestarini | 323—13 |
| 2,303,293 | 11/42 | Thomas | 310—186 |
| 2,467,751 | 4/49 | Hoover et al. | 310—224 |

MILTON O. HIRSHFIELD, *Primary Examiner.*

ORIS L. RADER, *Examiner.*

UNITED STATES PATENT OFFICE
CERTIFICATE OF CORRECTION

Patent No. 3,183,386            May 11, 1965

William R. Miller

It is hereby certified that error appears in the above numbered patent requiring correction and that the said Letters Patent should read as corrected below.

Column 8, equation 17 should appear as shown below instead of as in the patent:

$$\frac{\sqrt{\frac{L_1}{L_2}} + \sqrt{\frac{L_2}{L_1}}}{K_c} = X$$

column 9, equation 31 should appear as shown below instead of as in the patent:

$$K_3 - 1 = \frac{-2M}{L_1 + L_2}, \text{ but } M = K_c \sqrt{L_1 L_2}$$

column 12, lines 8 to 10, the equation should appear as shown below instead of as in the patent:

$$X = \sqrt{\frac{\sqrt{\frac{L_1}{L_2}} + \sqrt{\frac{L_2}{L_1}}}{K_c}}$$

lines 36 to 39, the equation should appear as shown below instead of as in the patent:

$$1 - \frac{2K_c}{\sqrt{\frac{L_1}{L_2}} + \sqrt{\frac{L_2}{L_1}}}$$

same column 12, lines 72 to 75, the equation should appear as shown below instead of as in the patent:

$$X = \frac{\sqrt{\frac{L_1}{L_2}} + \sqrt{\frac{L_2}{L_1}}}{K_C}$$

column 13, lines 25 to 30, the equation should appear as shown below instead of as in the patent:

$$X = \frac{\sqrt{\frac{L_1}{L_2}} + \sqrt{\frac{L_2}{L_1}}}{K_C}$$

column 14, lines 20 to 22, the equation should appear as shown below instead of as in the patent:

$$X = \frac{\sqrt{\frac{L_1}{L_2}} + \sqrt{\frac{L_2}{L_1}}}{K_C}$$

Signed and sealed this 3rd day of May 1966.

(SEAL)
Attest:

ERNEST W. SWIDER
Attesting Officer

EDWARD J. BRENNER
Commissioner of Patents